US009174641B2

(12) United States Patent
Fritz et al.

(10) Patent No.: US 9,174,641 B2
(45) Date of Patent: Nov. 3, 2015

(54) SAFETY DEVICE FOR A MOTOR VEHICLE AND METHOD FOR OPERATING A MOTOR VEHICLE

(75) Inventors: Stefan Fritz, Erzhausen (DE); Bernd Hartmann, Bad Homburg (DE); Alfred Eckert, Mainz-Hechtsheim (DE); Peter Rieth, Eltville (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/002,171

(22) PCT Filed: Mar. 8, 2012

(86) PCT No.: PCT/EP2012/053994
§ 371 (c)(1),
(2), (4) Date: Aug. 29, 2013

(87) PCT Pub. No.: WO2012/120076
PCT Pub. Date: Sep. 13, 2012

(65) Prior Publication Data
US 2013/0338878 A1    Dec. 19, 2013

(30) Foreign Application Priority Data

Mar. 9, 2011    (DE) .......................... 10 2011 005 262

(51) Int. Cl.
*B60W 30/09*    (2012.01)
*B60W 10/18*    (2012.01)
(Continued)

(52) U.S. Cl.
CPC ............. *B60W 30/085* (2013.01); *B60W 10/18* (2013.01); *B60W 10/184* (2013.01); *B60W 10/20* (2013.01); *B60W 30/09* (2013.01);
(Continued)

(58) Field of Classification Search
None
See application file for complete search history.

(56) References Cited

U.S. PATENT DOCUMENTS 5,694,321 A    12/1997    Eckert et al.
5,711,023 A    1/1998    Eckert et al.
(Continued)

FOREIGN PATENT DOCUMENTS

DE    100 12 737    9/2001
DE    100 60 498    10/2001
(Continued)

OTHER PUBLICATIONS

International Search Report of the International Searching Authority for International Application PCT/EP2012/053994, mailed May 29, 2012, 3 pages, European Patent Office, HV Rijswijk, Netherlands.
(Continued)

*Primary Examiner* — Rami Khatib
*Assistant Examiner* — Jeffrey Boomer
(74) *Attorney, Agent, or Firm* — W. F. Fasse (57) ABSTRACT

In a device and a method for increasing the safety of a motor vehicle, a first sensor unit (2) detects the environment, in particular free spaces and objects (0) and the position and motion thereof, a second sensor unit (20) detects the environment state, a third sensor unit (30) detects the vehicle state, and a fourth sensor unit (40) detects the driver inputs. The respective data from the several sensor units are combined. In consideration of the data, a driving safety coordinator (6) calculates the risk of collision on the basis of a risk evaluation, and determines pre-collision phases (P1, P2, P3, P4a, P4b) of the motor vehicle (1) with regard to the object (0).

19 Claims, 5 Drawing Sheets (51) Int. Cl.
*B60W 10/20* (2006.01)
*B60W 50/14* (2012.01)
*B60W 50/16* (2012.01)
*B60W 10/184* (2012.01)
*B60W 30/085* (2012.01)
*B60W 30/095* (2012.01)

(52) U.S. Cl.
CPC ...... *B60W 30/0953* (2013.01); *B60W 30/0956* (2013.01); *B60W 50/14* (2013.01); *B60W 50/16* (2013.01); *B60W 2550/12* (2013.01); *B60W 2550/148* (2013.01); *B60W 2600/00* (2013.01)

(56) References Cited

U.S. PATENT DOCUMENTS

| | | | |
|---|---|---|---|
| 6,017,101 | A | 1/2000 | Matsuda |
| 6,272,418 | B1 | 8/2001 | Shinmura et al. |
| 6,289,281 | B1 | 9/2001 | Shinmura et al. |
| 6,292,753 | B1 | 9/2001 | Sugimoto et al. |
| 6,567,748 | B2 | 5/2003 | Matsuno |
| 6,567,749 | B2 | 5/2003 | Matsuura |
| 6,820,007 | B2 | 11/2004 | Abe et al. |
| 6,926,374 | B2 | 8/2005 | Dudeck et al. |
| 6,959,970 | B2 | 11/2005 | Tseng |
| 6,962,396 | B2 | 11/2005 | Faye et al. |
| 6,968,920 | B2 | 11/2005 | Barton et al. |
| 7,015,805 | B2 | 3/2006 | Knoop et al. |
| 7,035,735 | B2 | 4/2006 | Knoop et al. |
| 7,213,687 | B2 | 5/2007 | Sakai et al. |
| 7,729,841 | B2 | 6/2010 | Knoop et al. |
| 7,734,418 | B2 | 6/2010 | Shoda et al. |
| 7,739,008 | B2 | 6/2010 | Cieler et al. |
| 7,778,753 | B2 | 8/2010 | Fujiwara et al. |
| 8,086,406 | B2 | 12/2011 | Ewerhart et al. |
| 8,126,626 | B2 | 2/2012 | Zagorski |
| 8,146,703 | B2 | 4/2012 | Baumann et al. |
| 8,255,121 | B2 | 8/2012 | Zagorski et al. |
| 8,392,062 | B2 | 3/2013 | Oechsle et al. |
| 8,423,277 | B2 | 4/2013 | Shirato |
| 8,452,506 | B2 | 5/2013 | Groult |
| 8,538,674 | B2 | 9/2013 | Breuer et al. |
| 2001/0039472 | A1 | 11/2001 | Isogai et al. |
| 2004/0030497 | A1 | 2/2004 | Knoop et al. |
| 2004/0030498 | A1* | 2/2004 | Knoop et al. ............... 701/301 |
| 2004/0090117 | A1* | 5/2004 | Dudeck et al. ............... 303/191 |
| 2004/0158377 | A1 | 8/2004 | Matsumoto et al. |
| 2004/0193374 | A1 | 9/2004 | Hac et al. |
| 2005/0004738 | A1 | 1/2005 | Gronau et al. |
| 2005/0267683 | A1 | 12/2005 | Fujiwara et al. |
| 2006/0100766 | A1* | 5/2006 | Schwarz et al. ............... 701/71 |
| 2006/0163943 | A1* | 7/2006 | Von Holt et al. ............... 303/177 |
| 2006/0195231 | A1 | 8/2006 | Diebold et al. |
| 2007/0052530 | A1* | 3/2007 | Diebold et al. ............... 340/467 |
| 2007/0129891 | A1 | 6/2007 | Yano et al. |
| 2007/0294019 | A1 | 12/2007 | Nishira |
| 2007/0299610 | A1* | 12/2007 | Ewerhart et al. ............... 701/301 |
| 2008/0046145 | A1 | 2/2008 | Weaver et al. |
| 2008/0208408 | A1* | 8/2008 | Arbitmann et al. ............... 701/41 |
| 2008/0319610 | A1* | 12/2008 | Oechsle et al. ............... 701/41 |
| 2009/0212930 | A1 | 8/2009 | Pfeiffer et al. |
| 2009/0222166 | A1 | 9/2009 | Arbitmann et al. |
| 2009/0234543 | A1 | 9/2009 | Groitzsch et al. |
| 2010/0211235 | A1 | 8/2010 | Taguchi et al. |
| 2011/0015818 | A1* | 1/2011 | Breuer et al. ............... 701/29 |
| 2011/0082623 | A1 | 4/2011 | Lu et al. |
| 2011/0190961 | A1 | 8/2011 | Giebel et al. |
| 2011/0196576 | A1 | 8/2011 | Staehlin |
| 2012/0065861 | A1 | 3/2012 | Hartmann et al. |
| 2014/0005875 | A1 | 1/2014 | Hartmann et al. |
| 2014/0074388 | A1 | 3/2014 | Bretzigheimer et al. |

FOREIGN PATENT DOCUMENTS

| | | |
|---|---|---|
| DE | 100 36 276 | 2/2002 |
| DE | 102 31 556 | 1/2003 |
| DE | 102 37 714 | 2/2004 |
| DE | 103 16 413 | 10/2004 |
| DE | 103 34 203 | 3/2005 |
| DE | 102005002760 | 8/2005 |
| DE | 102004060053 | 12/2005 |
| DE | 102005031854 | 2/2006 |
| DE | 102004056120 | 5/2006 |
| DE | 102004059002 | 6/2006 |
| DE | 102005003177 | 7/2006 |
| DE | 102005003274 | 7/2006 |
| DE | 102005035624 | 2/2007 |
| DE | 102005037479 | 2/2007 |
| DE | 102006036921 | 4/2007 |
| DE | 102005062275 | 6/2007 |
| DE | 102006057744 | 7/2008 |
| DE | 102008040241 | 1/2010 |
| DE | 102009020649 | 11/2010 |
| EP | 1 600 321 | 11/2005 |
| EP | 1 735 187 | 12/2006 |
| EP | 1 977 946 | 10/2008 |
| JP | 2007-022232 A | 2/2007 |
| WO | WO 2004/103798 | 12/2004 |
| WO | WO 2006/045826 | 5/2006 |
| WO | WO 2009/086857 | 7/2009 |

OTHER PUBLICATIONS

PCT International Preliminary Report on Patentability including English Translation of PCT Written Opinion of the International Searching Authority for International Application PCT/EP2012/053994, issued Sep. 10, 2013, 9 pages, International Bureau of WIPO, Geneva, Switzerland.

German Search Report for German Application No. 10 2012 203 673.3, dated Nov. 19, 2012, 6 pages, Muenchen, Germany, with English translation, 5 pages.

English translation of German Patent Application Publication DE 10 2009 020 649 A1, published Nov. 18, 2010.

* cited by examiner

SAFETY DEVICE FOR A MOTOR VEHICLE AND METHOD FOR OPERATING A MOTOR VEHICLE

FIELD OF THE INVENTION

This invention relates to a safety device for a motor vehicle with sensor units for detecting at least environmental conditions and evaluation units for evaluating various data. the invention further relates to a method for operating a motor vehicle.

BACKGROUND INFORMATION

Such a safety device and method for increasing safety in road traffic is known from EP 1 735 187 A1. In the known system, a supporting driving maneuver is determined during or after a steering action as part of an avoidance maneuver initiated by the driver, wherein the driver input can be overridden at any time. This known method determines based on environmental signals if a critical situation with respect to driving dynamics exists or if a collision is imminent. The method is preferably used for avoidance maneuvers in emergency situations.

SUMMARY OF THE INVENTION

It an object of an embodiment of the present invention to introduce a method which, taking into account the driving situation, proactively ensures maximum or improved driving safety that supports the driver in his or her driving job.

This object is achieved by a method and device having the features of the independent claims. A system and a method are proposed for situation and collision phase optimized brake force control and chassis adjustment for combined braking/avoidance maneuvers for motor vehicles. A driving safety coordinator is provided that calculates the collision risk based on a risk assessment. In addition, the driving safety coordinator determines multiple precollision phases of the vehicle with respect to the object. In this process, the driving safety coordinator determines the last point to brake for stopping before reaching the object, a last point to steer of the unbraked vehicle for evading or avoiding the object, and a last point to steer of the braked vehicle for evading or avoiding the object. The precollision phases are designed such that they start or end at these points. One rationale of the invention is that the driving safety coordinator extends the precollision phases situatively by a driver-independent braking intervention.

An underlying idea of an apparatus embodiment of the invention is that the driving safety coordinator predictively and situatively performs a combined braking/avoiding maneuver within the precollision phases of the motor vehicle to ensure operational safety. In this way, the driving safety coordinator makes the precollision phases controllable for the driver, either situatively or based on driver input, in accordance with the collision risk, the vehicle state and the proposed coefficient of friction, taking into account an avoidance option, a combined braking/avoiding maneuver or a braking maneuver.

In a further development of the subject matter of the invention, the driving safety coordinator receives information regarding the coefficient of friction between the tire and the road based on an estimate, wherein the proposed coefficient of friction is determined from a driver-independent or driver-initiated braking intervention.

In a particularly advantageous development, the driving safety coordinator predictively and situatively determines at least one permissible driving corridor and/or an optimal movement trajectory in order to ensure operational safety and restricts the driver input to the driving corridor using actively addressable components and keeps the motor vehicle in the driving corridor or on the movement trajectory using the actively addressable components. The driving safety coordinator is configured to give the driver a haptic, acoustic and/or optical warning and/or steering recommendation.

The object of an embodiment of the invention is also achieved by a method having the features of a further inventive embodiment. A safety coordinator calculates the collision risk and determines precollision phases of the motor vehicle with respect to the object. In this process, the last point to brake for stopping before reaching the object, a last point to steer of the unbraked vehicle for evading or avoiding the object, and a last point to steer of the braked vehicle for evading or avoiding the object are determined. The precollision phases start or end at these points. The precollision phases are also extended by means of a driver-independent braking intervention.

An underlying idea of a method embodiment of the invention is that a combined braking/avoiding maneuver is performed predictively and situatively within the precollision phases of the motor vehicle to ensure operational safety. In this way, the precollision phases are optimized and made controllable for the driver, either situatively or based on driver input, in accordance with the collision risk, the vehicle state and the proposed coefficient of friction, taking into account an avoidance option, a combined braking/avoiding maneuver or a braking maneuver.

Another idea of an embodiment of the invention is that the precollision phases are redetermined if another object is detected in the direction of movement of the vehicle. In a subsequent scenario, the precollision phases are repeated if another obstacle occurs after or during a change into another lane. The respective phases of the method will then be repeated.

BRIEF DESCRIPTION OF THE DRAWINGS

The invention will be explained in more detail below, with reference to an embodiment and the accompanying drawings, wherein.

DETAILED DESCRIPTION OF EXAMPLE EMBODIMENTS OF THE INVENTION

The term "steering wheel" in the meaning of this invention represents all conceivable man-machine interfaces that a driver can operate for steering and driving the motor vehicle, such as switch inputs, a joystick or a touch pad, as well as remotely transmitted actuator commands.

A safety device for motor vehicles in general will be explained with reference to FIGS. 1 and 2 and an embodiment of the invention will be explained with reference to FIGS. 3 and 4 below.

Figure 1:
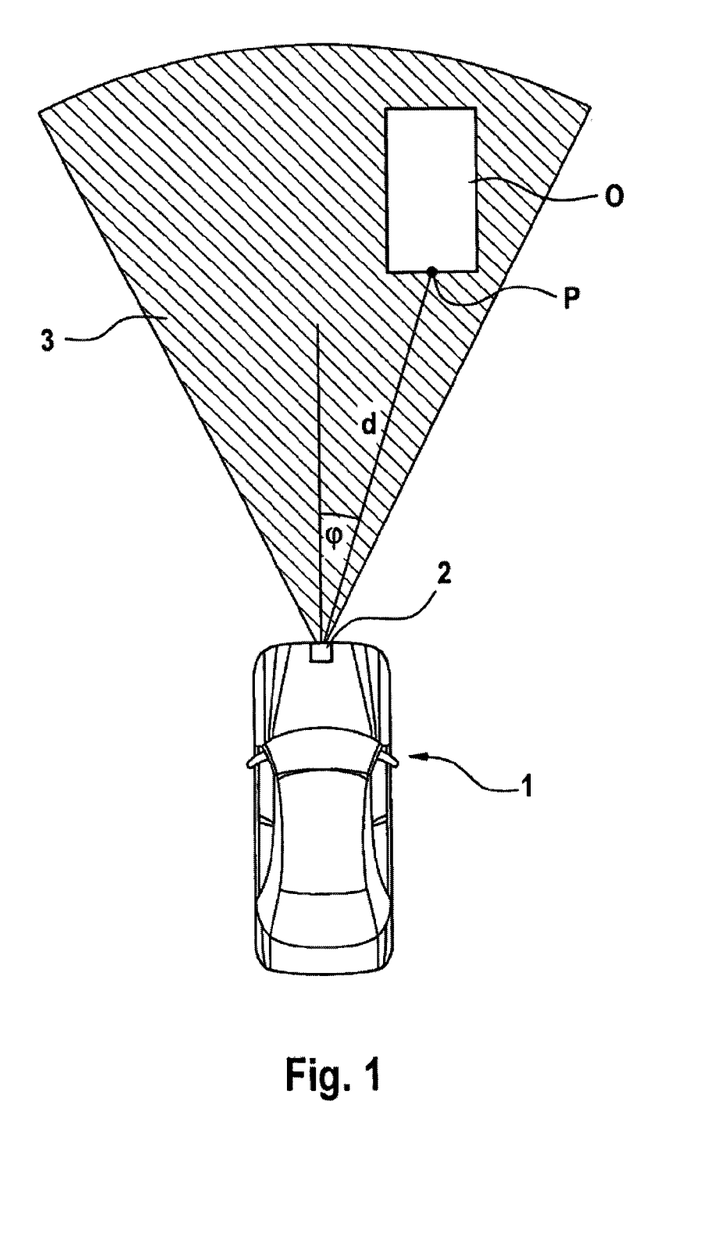
FIG. 1 shows a schematic of a vehicle with environment sensors for detecting objects in the environment of the vehicle.

FIG. 1 shows an example of a four-wheel, two-axle vehicle 1 that has environment sensors 2 with which objects O in the environment of the vehicle can be detected, which in particular are other vehicles in the same or a neighboring traffic lane to the side from, and/or in front of, the vehicle. Objects O can also be static or almost static objects such as trees, pedestrians, or roadside borders. An example of environment sensors 2 is shown with a detection range 3 that captures a solid angle in front of, next to, or behind the vehicle 1 in which an exemplary object O is shown. The one or more environment sensors 2 may, for example, comprise a LIDAR (Light Detection and Ranging) sensor that is generally known to a person skilled in the art. Other environment sensors such as radar sensors or optical camera systems can also be used.

Furthermore, the information about the environment can be detected using so-called car-to-x communication. This means transmission of environmental information from other vehicles or detection points to the vehicle 1. The environment sensors 2 measure the distances d to the detected points of an object and the angles φ between the connecting lines to these points and the central longitudinal axis of the vehicle, as shown by way of example in FIG. 1 for a point P of the object O. The fronts of the detected objects that face towards the vehicle are composed of multiple acquired points, for which sensor signals are transmitted that establish correlations between points and the shape of an object and determine a reference point for the object O. For example, the center of the object O or the center of the acquired points of the object can be selected as the reference point. Unlike a radar sensor (Doppler effect), a LIDAR environment sensor 2 cannot directly measure the speeds of the detected points and therefore the speed of the detected objects. They are calculated from the difference between the distances measured at subsequent time steps in a cyclically operating object recognition unit 21. Acceleration of the objects can in principle be determined in a similar way by deriving their positions two times.

Figure 2:
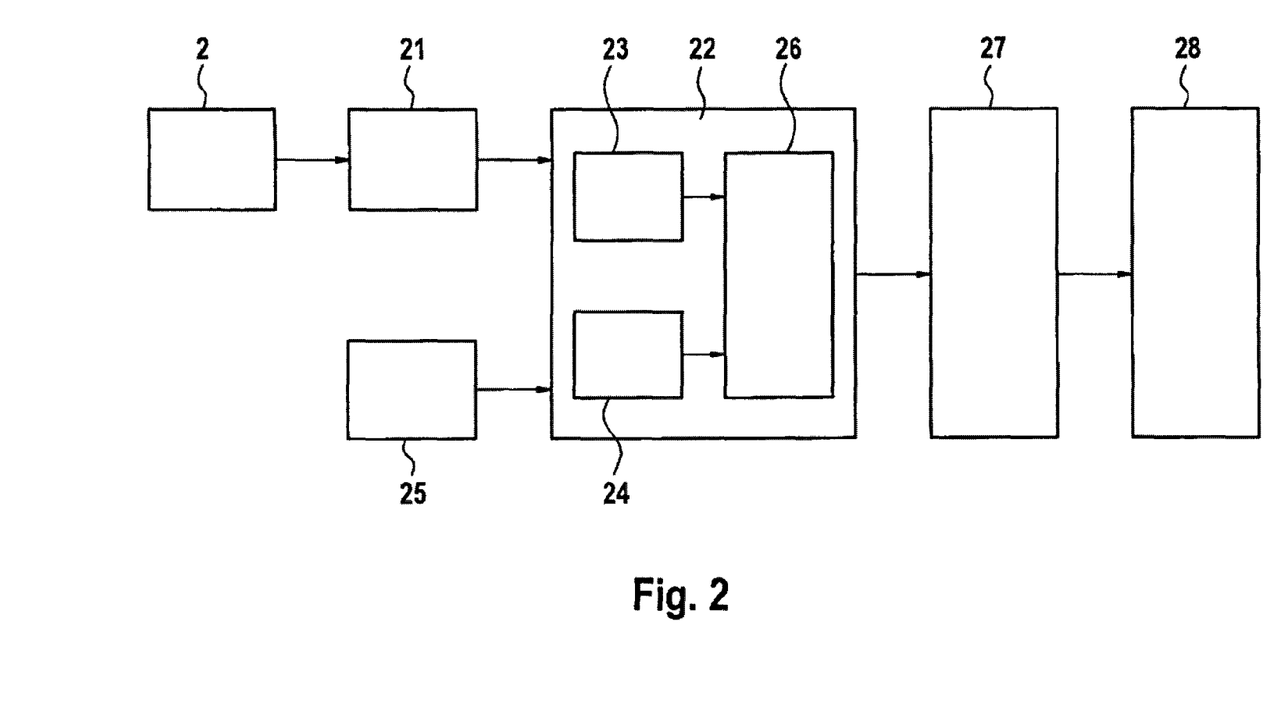
FIG. 2 shows a schematic of a driver assistance system.

FIG. 2 shows a diagram of a driver assistance system whose components, except for sensors and actuators and other hardware, are preferably made up of software modules that are executed using a microprocessor inside the vehicle 1. As shown in FIG. 2, object data in the form of electronic signals is transmitted to a decision means 22 within the block diagram of the driver assistance system. The decision means 22 determines an object trajectory based on the information about the object O in block 23. In addition, it determines a movement trajectory of the vehicle 1 in block 24 based on information about the dynamic status of the vehicle 1 that can be obtained using other vehicle sensors 25. Information used particularly includes the vehicle speed that can be determined using wheel speed sensors, the steering angle δ measured using a steering angle sensor on the steerable wheels of the vehicle 1, the yaw rate and/or lateral acceleration of the vehicle 1 that are measured using respective sensors. It is further possible to calculate or estimate model-based variables from the dynamic vehicle states measured using the vehicle sensors 25. An indication of the coefficient of friction between the tires of the vehicle 1 and the road is also obtained from the vehicle sensors or from the condition of the road surface. This proposed coefficient of friction is in particular determined by the brake control system. The decision means 22 then checks in block 26 if the motor vehicle 1 is on a collision course with one of the detected objects O. If such a collision course is found and the collision time, i.e. the time before the detected collision with the object O will occur, which is also determined by the decision means, falls below a specific value, a trigger signal is sent to a path control means 27. The trigger signal initially triggers the calculation of an evasive path, i.e. a movement trajectory, in the path control means. Then a starting point for the evasive maneuver is determined based on the evasive path or movement trajectory determined, which is the point at which the evasive maneuver must be started to be able to just avoid the object O. These steps are preferably repeated in time increments until there is no more collision risk due to course changes of the object O or the vehicle 1 or until the vehicle 1 reaches the starting point for an evasion maneuver. If this is the case, the evasive path or parameters representing this path are sent to a steering actuator control means 28.

Figure 3:
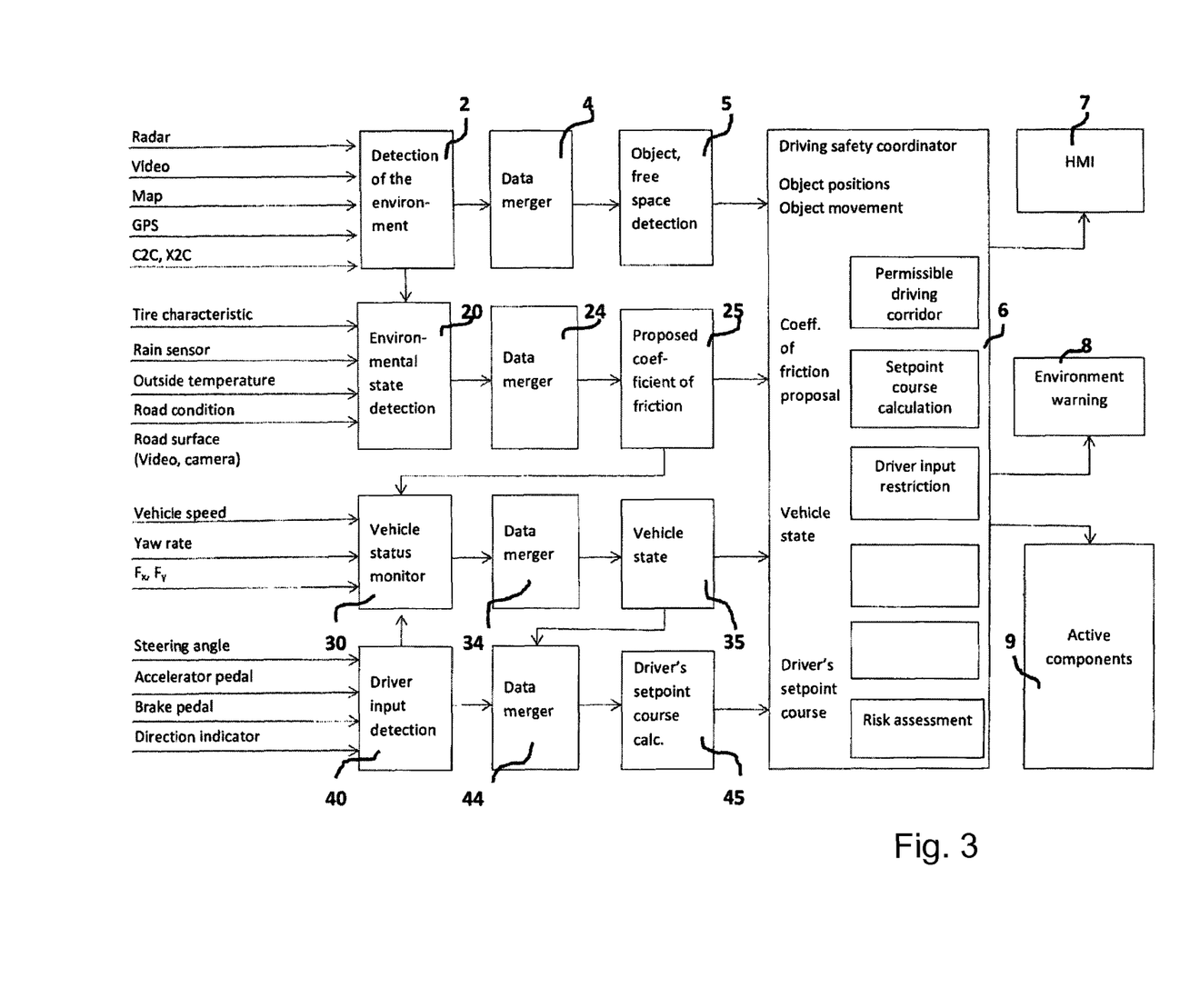
FIG. 3 shows a block diagram of the safety device according to the invention.

FIG. 3 shows a schematic of the safety device according to the invention. The underlying idea is the interconnection of the various sensor units 2, 20, 30, 40. A data merger is performed using the data available from the sensor units 2, 20, 30, 40. A data merger is the pooling and completion of incomplete records for data cleansing. Several records, some of which are incomplete, must be combined to obtain a complete picture of the environment. Before data of the records from two sensor units 2, 20, 30, 40 can be merged, the data must be brought into a joint data schema. This process is also called data schema integration. The data merger makes it possible to obtain information on the environment of the vehicle 1 at improved data quality. Better data quality means more accurate and faster calculation of the collision risk and the precollision phases P1, P2, P3, P4a, P4b. As is explained below, data is also merged to obtain improved information on the condition of the environment, the vehicle state and driver input.

At least one sensor unit 2 is used to detect the environmental conditions. As stated above, this system of environment sensors 2 is comprised of a radar, lidar, or video camera system or a combination thereof. The information obtained using at least one of these sensor units 2 is pooled with map information, GPS data and information received using car-to-x communication to obtain an environmental information pool in an evaluation unit 4. After the merger of the data, the improved environmental data is evaluated with the purpose of detecting objects O. The position and movement information of an object O is sent to a driving safety coordinator 6. This driving safety coordinator 6 determined precollision phases P1, P2, P3, P4a, P4b based on limits of driving physics and taking into account the environment data, and thus predictively and situatively ensures the operational safety of the vehicle 1 in that the precollision phases P1, P2, P3, P4a, P4b are designed such that a combined braking/avoiding maneuver or a braking maneuver is performed. The precollision phases P1, P2, P3, P4a, P4b are explained in more detail with reference to FIG. 4 below.

As can further be derived from FIG. 3, at least one other sensor unit 20 is used to detect the state of the surroundings. This at least one sensor unit 20 for detecting an environmental state is formed by a rain sensor, a thermoelement and/or a camera system. The environmental status information detected and the tire characteristic of the vehicle tires used are merged in the evaluation unit 24, and a proposed coefficient of friction between the tires and the road surface is determined from the cleansed environment data in step 25. The proposed coefficient of friction may for example be based on knowledge of the condition of the road surface. The determined coefficient of friction proposal is also forwarded to the driving safety coordinator 6.

Another at least one sensor unit 30 is used to detect the vehicle state. The at least one sensor unit 30 for detecting the vehicle state consists of a wheel speed sensor, a lateral acceleration sensor, a longitudinal acceleration sensor, and/or a yaw rate sensor. A combination of the sensors mentioned is also conceivable. The sensor unit 30 for detecting the vehicle state is also called vehicle status monitor. An evaluation unit 34 associated with the vehicle status monitor combines the vehicle status data with the determined coefficient of friction proposal in the form of a data merger. The vehicle status is calculated in this way in step 35 and output to the driving safety coordinator 6.

As FIG. 3 also discloses, at least one other sensor unit 40 is provided to detect driver input and to output driver input data. This at least one sensor unit 40 for detecting the driver input is formed by a steering angle sensor, a pedal angle sensor for the brake pedal and/or the accelerator pedal and/or a transmitter of the direction indicator. The transmitter of the direction indicator is colloquially referred to as a flasher. The information says if the driver wants to turn left or right. The vehicle status information just determined is sent to the evaluation unit 44 and merged there with the driver input data. Since the data merger means pooling and completion of incomplete records, it results in data cleansing, and a precise driver's setpoint course is calculated in step 45 and output to the driving safety coordinator 6.

Thus the position and movement of the object O and the determined coefficient of friction proposal are transmitted to the driving safety coordinator 6. The driving safety coordinator 6 also receives information about the vehicle state and the driver's setpoint course. These data are used to determine a permissible driving corridor or an optimum movement trajectory. The driving corridor or movement trajectory is determined situatively and predictively. The driving corridor or movement trajectory bypass the object O on its left and right within the predicted avoidance space. To keep the vehicle 1 in the permissible corridor or optimum movement trajectory, active components 9 are actuated such that the driver input is restricted to the available corridor or optimum movement trajectory. These actively addressable or actuatable components 9 are located in the chassis or in a man-machine interface such as brake pedal, driving engine, steering system, transmission, shock absorber, stabilizer, or direction indicator. The driving safety coordinator 6 actuates the actively addressable or actuatable components 9 such that a counterforce is generated in the accelerator pedal, an intervention in the driving engine, an intervention in the power train, or a braking interventions is performed to keep the vehicle in the driving corridor or movement trajectory. Alternatively, or in addition, the actively addressable or actuatable components 9 are actuated such that an additional steering torque and/or additional steering angle or a braking intervention aimed at individual wheels is generated to generate a yaw moment. This actuation is also suited to keep the vehicle in the driving corridor or movement trajectory. In a special embodiment, the driver can override each action of the system, so that the driver keeps control over his or her vehicle 1. It will now be explained with reference to FIG. 4 how the situation optimized brake force control for a combined braking/avoiding maneuver is performed within the precollision phases according to the invention. In phase P0, the vehicle 1 approaches an object 0 in the direction of travel shown, and a warning W is issued to the driver. This warning W is given via a man-machine interface 7, also called human machine interface or in short HMI. The warning W can be given to the driver haptic, acoustic, or optical means. All addressable components of the man-machine interface 7 are suitable, such as a counterforce on the accelerater pedal or a vibration of the steering wheel. Warning lamps and acoustic warnings are also suitable for warning the driver of the vehicle.

In the precollision phase P1, the driving safety coordinator 6 calculates a last point to brake (PTB). In addition, a last point to steer PTS-u of the unbraked vehicle 1 and a last point to steer PTS-b of the braked vehicle 1 are determined. The abbreviations PTS-u and PTS-b were derived from the English terms "last point to steer—unbraked" and "last point to steer—braked lane change". The lane can be changed to the left or to the right and several subsequent times, as shown. A multi-object and multi-collision situation is assumed for multiple avoidance maneuvers.

Figure 4:
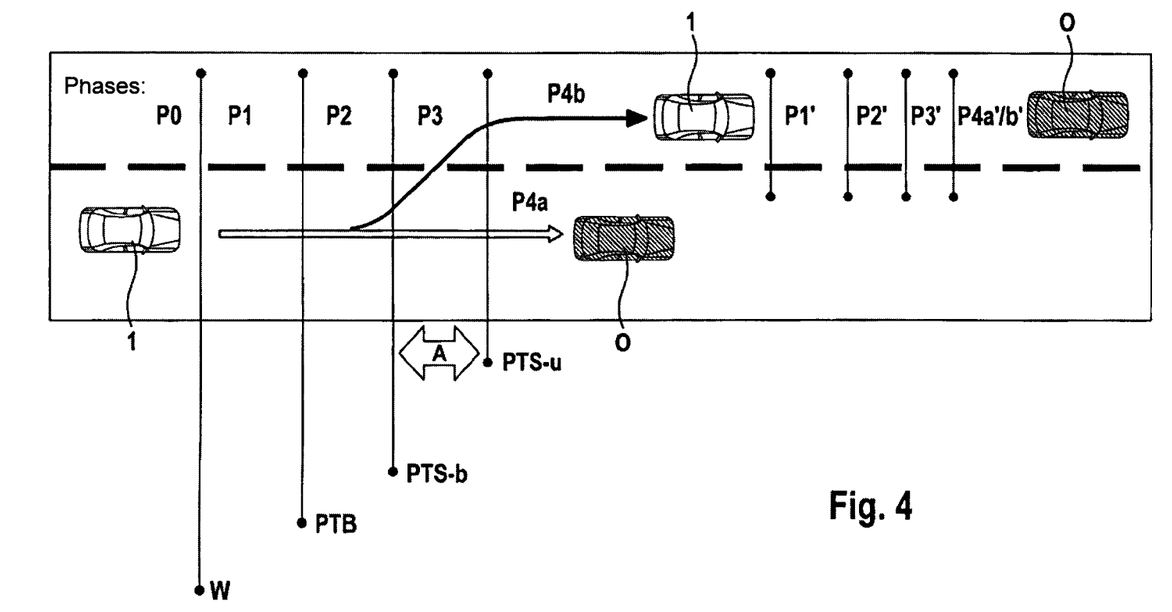
FIG. 4 shows a schematic of precollision phases.
Figure 5A:
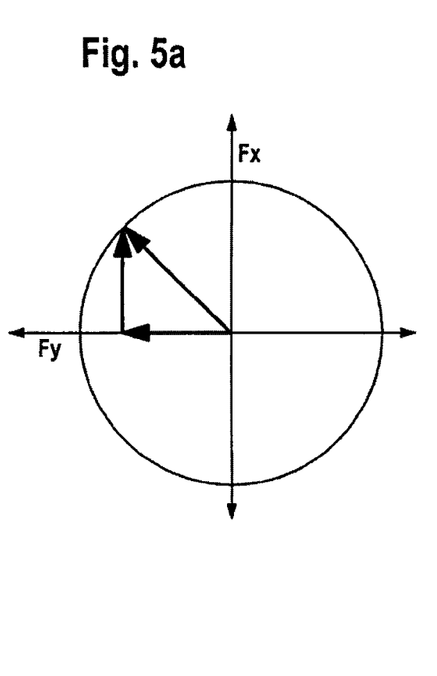
FIG. 5a,b shows the longitudinal and transverse forces of a vehicle tire, also known as Kamm's circle.
Figure 5B:
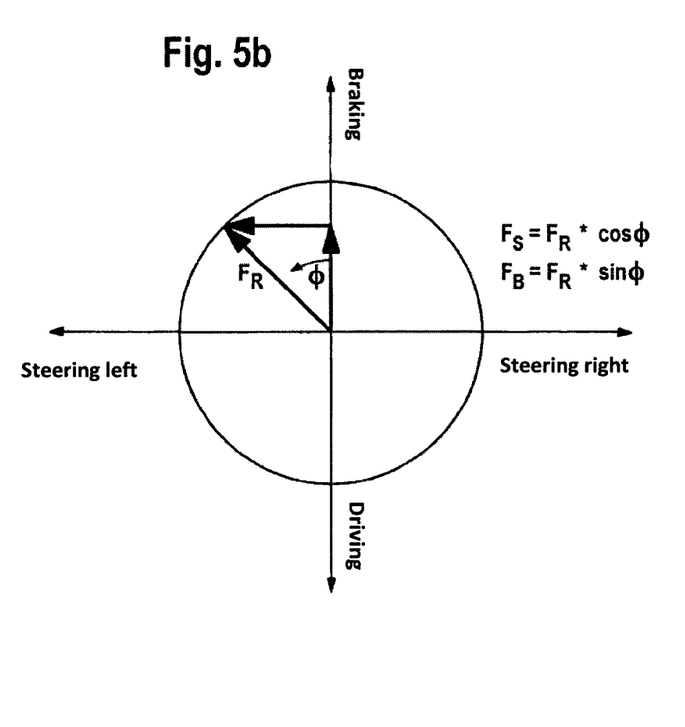

As can also be derived from FIG. 4, the position and length of the precollision phase P3 between the last point to steer PTS-u of the unbraked vehicle 1 and the last point to steer PTS-b of the braked vehicle 1 can be influenced, which is indicated by the double-headed arrow A. The precollision phase P3 can be changed when the situation requires it by a driver-independent braking intervention. In other words, the position of the last point to steer of the braked and unbraked vehicle 1 PTS-u and PTS-b and thus the length of the precollision phase P3 is set by means of brake force distribution such that an avoiding maneuver will be made possible only if the system has detected an avoidance option. The reason why the last point to steer PTS-b of the braked vehicle 1 is further to the left than the last point to steer PTS-u of the unbraked vehicle is that a vehicle tire can transfer more steering forces to the road if the vehicle tire only has to transfer little or no brake force to the road. Brief reference will be made in this context to Kamm's circle shown in FIGS. 5a and 5b: It results in a direction vector for the vehicle 1. The vehicle tire transfers forces to the road when the vehicle 1 accelerates or brakes and just like when it is steered to the left or to the right. As can be derived directly from the Kamm's circle, the unbraked, non-driven vehicle wheel can transfer the greatest steering forces to the road.

If at the start of precollision phase P3 the brake pressure of a driver-independent braking intervention in the wheel brakes is reduced or lowered down to zero, the wheels will be easier to steer because more steering force can be transferred to the road, as has been explained as well. If the brake pressure is reduced or lowered to zero at the start of precollision phase P3, the last point to steer moves towards the obstacle or object O. This last point to steer is then the PTS-u of the unbraked vehicle 1 since the brake pressure was reduced to zero. This means that the position and length of the precollision phase P3 is changed by the distribution of the brake force. The method described here utilizes this knowledge in that the driving safety coordinator 6 situatively influences the position and length of the precollision phase P3 between the last point to steer PTS-u of the unbraked vehicle 1 for evading or avoiding the object, and the last point to steer PTS-b of the braked vehicle 1 for evading or avoiding the object O by means of a driver-independent braking intervention to optimize an emergency brake operation in the precollision phase P4a or an avoidance maneuver in the precollision phase P4b. The brake force of the driver-independent braking intervention may either be distributed evenly or unevenly over the right and left wheels of the vehicle 1, so that the avoidance maneuver is supported if the brake force is distributed unevenly.

If there is no avoidance space available, the brake power is optimized at an early point in time well before the PTS-u so that as much speed as possible is lost. The driver is warned respectively earlier. This means that the driving safety coordinator initiates an emergency brake operation in the precollision phase P4a if there is no avoidance option available. In this case, the brake power is optimized in the precollision phase P4a. A collision of the vehicle 1 with the object O can just be avoided by this measure, or the consequences of the collision are reduced as much as the space available as brake path allows.

The driving safety coordinator 6 predictively and situatively determines at least one permissible driving corridor and/or an optimum movement trajectory in order to ensure operational safety. As explained with reference to FIG. 3, actively addressable or actuatable components 9 restrict the driver input to the driving corridor and keep the motor vehicle 1 in the driving corridor or on the movement trajectory. The driving safety coordinator 6 influences the position and length of the precollision phase P3 between the last point to steer PTS-u of the unbraked vehicle 1 for evading or avoiding the object O, and the last point to steer PTS-b of the braked vehicle 1 for evading or avoiding the object O, or the last possible points to steer PTS-u, PTS-b to optimize an avoidance maneuver, taking into account the permissible driving corridor and/or the optimum movement trajectory.

If an avoidance option is detected, a combined braking/avoiding maneuver is performed in precollision phase P3. In the subsequent phase P4b, the driver-independent braking intervention is released again so that a rapid passage by the obstacle is not hindered. If the lane is blocked by another obstacle O, the precollision phases P1', P2', P3', P4a', and P4b' are determined anew. Another combined braking/avoiding maneuver is performed in accordance with the new precollision phases P1', P2', P3', P4a', P4b'.

The evaluation units 4, 5, 24, 25, 34, 35, 44, 45 may also be designed as software components or process steps of a method within a common evaluation unit.

In the present invention, a driving safety coordinator, taking into account the environment, environmental conditions, the vehicle state and the driver input, divides a critical driving situation into the precollision phases P1, P2, P3, P4a, P4b and influences the position and length of phase P3 by means of driver-independent braking interventions such that an emergency brake operation P4a, an emergency avoidance maneuver P4b, or a combined emergency braking/avoiding maneuver is optimized. It is also configured that the precollision phases P1', P2', P3', P4a', P4b' are determined anew when another object 0 is detected in the direction of movement of the vehicle 1.

The invention claimed is:

1. A safety system for a motor vehicle, comprising:
   a first sensor unit (2) mounted on the vehicle, and configured and arranged to detect objects in an environment outside of the vehicle, and to output corresponding plural detected object data,
   a second sensor unit (20) mounted on the vehicle, and configured and arranged to detect a friction-relevant state of the environment and to output corresponding friction status data,
   a third sensor unit (30) mounted on the vehicle, and configured and arranged to detect a vehicle status of the vehicle and to output corresponding vehicle status data,
   a fourth sensor unit (40) mounted on the vehicle, and configured and arranged to detect driver inputs of a driver of the vehicle and to output corresponding driver input data,
   a first evaluation unit (4) connected and configured to receive and merge the plural detected object data and to output corresponding merged object data,
   a second evaluation unit (5) connected and configured to receive and evaluate the merged object data, and based thereon to determine unoccupied spaces and a potential collision obstacle among the objects in the environment, and a position and movement of the potential collision obstacle, and to output corresponding unoccupied space and obstacle data,
   a third evaluation unit (24) connected and configured to receive and merge the plural detected object data and the friction status data, and to determine therefrom and output a proposed coefficient of friction (25),
   a fourth evaluation unit (34) connected and configured to receive and merge the vehicle status data, the proposed coefficient of friction and the driver input data to determine therefrom and output a driving state (35),
   a fifth evaluation unit (44) connected and configured to receive and merge the driver input data and the driving state, and to determine therefrom and output a driver's specified course, and
   a driving safety coordinator (6) connected and configured to receive and evaluate the unoccupied space and obstacle data, the proposed coefficient of friction, the driving state and the driver's specified course, and therefrom to calculate a collision risk based on a risk assessment, to determine precollision phases of the vehicle with respect to the potential collision obstacle, and, dependent on the collision risk and the precollision phases, to perform at least one of:
      automatically emitting a warning to the driver of the vehicle through a human machine interface device of the vehicle,
      automatically controlling a braking system of the vehicle, or
      automatically controlling a steering system of the vehicle.

2. The safety system according to claim 1, wherein the first sensor unit comprises at least one device selected from the group consisting of a radar sensor configured to detect the objects based on a radar signal, a video sensor configured to detect the objects based on a video signal, a mapping device configured to detect the objects based on map data, a GPS position sensor configured to detect a position of the vehicle relative to the objects based on a GPS signal, a first communication device configured to detect the objects based on car-to-car transmitted data, and a second communication device configured to detect the objects based on data transmitted to the vehicle from an external transmitter separate from the vehicle, and
wherein the second sensor unit comprises at least one device selected from the group consisting of a rain sensor configured and arranged to detect rain in the environment, a temperature sensor configured and arranged to detect an outside temperature in the environment, a road surface condition sensor configured and arranged to determine a road surface condition of a road on which the vehicle drives, a camera or video sensor configured and arranged to determine a road surface characteristic of the road on which the vehicle drives, and a tire characteristic data sensor configured and arranged to determine a tire characteristic of a tire of the vehicle.

3. The safety system according to claim 1, wherein the driving safety coordinator is configured to determine a last point to brake the vehicle for stopping before reaching the obstacle, a last point to steer the vehicle without braking for avoiding the obstacle, and a last point to steer the vehicle with braking for avoiding the obstacle, and wherein the precollision phases respectively start or stop at respective ones of these points.

4. The safety system according to claim 3, wherein the driving safety coordinator is configured to situatively influence a position and a length of the precollision phase between the last point to steer the vehicle without braking and the last point to steer the vehicle with braking by a driver-independent braking intervention in the braking system to optimize an emergency brake operation of the braking system or a steering avoidance maneuver of the steering system.

5. The safety system according to claim 4, wherein the driving safety coordinator is configured to distribute a brake force of the driver-independent braking intervention unevenly over right and left wheels of the vehicle, so that the steering avoidance maneuver is supported by the brake force being distributed unevenly.

6. The safety system according to claim 3, wherein the driving safety coordinator is configured to influence a position and a length of the precollision phase between the last point to steer the vehicle without braking and the last point to steer the vehicle with braking, or between two latest points to steer the vehicle to optimize an avoidance maneuver, taking into account at least one of a permissible driving corridor and an optimum movement trajectory determined by the driving safety coordinator.

7. The safety system according to claim 1, wherein the driving safety coordinator is configured to perform a combined braking/steering avoidance maneuver predictively and situatively within the precollision phases.

8. The safety system according to claim 7, wherein the driving safety coordinator is configured to allow the driver to control a braking or steering operation of the vehicle during the precollision phases either situatively or based on the driver inputs, in accordance with the collision risk, the driving state and the proposed coefficient of friction, taking into account a steering avoidance maneuver, a combined braking/steering avoidance maneuver, and a braking avoidance maneuver.

9. The safety system according to claim 1, wherein the driving safety coordinator is configured to receive information regarding a coefficient of friction between a tire of the vehicle and a road on which the vehicle drives, based on an estimate, wherein the proposed coefficient of friction is determined from a driver-independent or driver-initiated braking intervention.

10. The safety system according to claim 1, wherein the driving safety coordinator is configured to predictively and situatively determine at least one of a permissible driving corridor and an optimal movement trajectory of the vehicle, and to restrict the driver inputs to the permissible driving corridor or the optimal movement trajectory using actively actuatable components of at least one of the braking system or the steering system of the motor vehicle, and to keep the vehicle in the permissible driving corridor or on the optimal movement trajectory using the actively actuatable components.

11. The safety system according to claim 1, wherein the driving safety coordinator is configured to issue the warning to the driver as at least one of a haptic warning, an acoustic warning, an optical warning and a steering recommendation to the driver.

12. The safety system according to claim 1,
wherein the second sensor unit is connected to the first sensor unit, and the third evaluation unit is connected to the second sensor unit to receive the plural detected object data from the first sensor unit via the second sensor unit, and
wherein the third sensor unit is connected to the third evaluation unit and to the fourth sensor unit, and the fourth evaluation unit is connected to the third sensor unit to receive the proposed coefficient of friction from the third evaluation unit via the third sensor unit, and to receive the driver input data from the fourth sensor unit via the third sensor unit.

13. A method of operating a safety system for a motor vehicle, comprising:
with a first sensor unit (2) mounted on the vehicle, detecting objects in an environment outside of the vehicle, and outputting corresponding plural detected object data,
with a second sensor unit (20) mounted on the vehicle, detecting a friction-relevant state of the environment and outputting corresponding friction status data,
with a third sensor unit (30) mounted on the vehicle, detecting a vehicle status of the vehicle and outputting corresponding vehicle status data,
with a fourth sensor unit (40) mounted on the vehicle, detecting driver inputs of a driver of the vehicle and outputting corresponding driver input data,
with a first evaluation unit (4) receiving and merging the plural detected object data and outputting corresponding merged object data,
with a second evaluation unit (5) receiving and evaluating the merged object data, and based thereon determining unoccupied spaces and a potential collision obstacle among the objects in the environment, and a position and movement of the potential collision obstacle, and outputting corresponding unoccupied space and obstacle data,
with a third evaluation unit (24) receiving and merging the plural detected object data and the friction status data, and determining therefrom and outputting a proposed coefficient of friction (25),
with a fourth evaluation unit (34) receiving and merging the vehicle status data, the proposed coefficient of friction and the driver input data and determining therefrom and outputting a driving state (35),
with a fifth evaluation unit (44) receiving and merging the driver input data and the driving state, and determining therefrom and outputting a driver's specified course, and
with a driving safety coordinator (6) receiving and evaluating the unoccupied space and obstacle data, the proposed coefficient of friction, the driving state and the driver's specified course, and therefrom calculating a collision risk based on a risk assessment, and determining precollision phases of the vehicle with respect to the potential collision obstacle, and, dependent on the collision risk and the precollision phases, performing at least one of:
automatically emitting a warning to the driver of the vehicle through a human machine interface device of the vehicle,
automatically controlling a braking system of the vehicle, or
automatically controlling a steering system of the vehicle.

14. The safety system according to claim 13,
wherein the first sensor unit comprises at least one device selected from the group consisting of a radar sensor configured to detect the objects based on a radar signal, a video sensor configured to detect the objects based on a video signal, a mapping device configured to detect the objects based on map data, a GPS position sensor configured to detect a position of the vehicle relative to the objects based on a GPS signal, a first communication device configured to detect the objects based on car-to-car transmitted data, and a second communication device configured to detect the objects based on data transmitted to the vehicle from an external transmitter separate from the vehicle, and
wherein the second sensor unit comprises at least one device selected from the group consisting of a rain sensor configured and arranged to detect rain in the environment, a temperature sensor configured and arranged to detect an outside temperature in the environment, a road surface condition sensor configured and arranged to determine a road surface condition of a road on which the vehicle drives, a camera or video sensor configured and arranged to determine a road surface characteristic of the road on which the vehicle drives, and a tire characteristic data sensor configured and arranged to determine a tire characteristic of a tire of the vehicle.

15. The method according to claim 13, further comprising determining, in the driving safety coordinator, a last point to brake the vehicle for stopping before reaching the obstacle, a last point to steer the vehicle without braking for avoiding the obstacle, and a last point to steer the vehicle with braking for avoiding the obstacle, and wherein the precollision phases respectively start or stop at respective ones of these points.

16. The method according to claim 15, further comprising situatively influencing, by the driving safety coordinator, a position and a length of the precollision phase between the last point to steer the vehicle without braking and the last point to steer the vehicle with braking by performing a driver-independent braking intervention in the braking system to optimize an emergency brake operation of the braking system or a steering avoidance maneuver of the steering system.

17. The method according to claim 13, further comprising performing, by the driving safety coordinator, a combined braking/steering avoidance maneuver predictively and situatively within the precollision phases.

18. The method according to claim 17, further comprising, by the driving safety coordinator, allowing the driver to control a braking or steering operation of the vehicle during the precollision phases either situatively or based on the driver inputs, in accordance with the collision risk, the driving state and the proposed coefficient of friction, taking into account a steering avoidance maneuver, a combined braking/steering avoidance maneuver, and a braking avoidance maneuver.

19. The method according to claim 13, further comprising, in the driving safety coordinator, determining a new set of precollision phases in at least one of a multi-obstacle situation and a multi-collision situation, when another potential collision obstacle is detected among the objects in the environment.

\* \* \* \* \*

UNITED STATES PATENT AND TRADEMARK OFFICE
CERTIFICATE OF CORRECTION

PATENT NO. : 9,174,641 B2
APPLICATION NO. : 14/002171
DATED : November 3, 2015
INVENTOR(S) : Stefan Fritz et al.

It is certified that error appears in the above-identified patent and that said Letters Patent is hereby corrected as shown below:

Specification

Column 1,
Line 9, replace "data. the" by --data. The--;
Line 29, after "It", insert --is--;

Column 5,
Line 51, after "vehicle 1", start a new paragraph;
Line 56, after "object", "0" should read --O--;
Line 60, before "haptic", --by-- should be inserted;
Line 62, after "on the", "accelerater" should read --accelerator--;

Column 6,
Line 40, after "vehicle 1", insert --,--;

Column 7,
Line 38, after "object", "0" should read --O--;

Claims

Column 10,
Line 52, claim 2, after "The", "safety system", should read --method--.

Signed and Sealed this
Twenty-fourth Day of May, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,174,641 B2 | Page 1 of 1 |
| APPLICATION NO. | : 14/002171 | |
| DATED | : November 3, 2015 | |
| INVENTOR(S) | : Stefan Fritz et al. | |

It is certified that error appears in the above-identified patent and that said Letters Patent is hereby corrected as shown below:

Specification

Column 1,
Line 9, replace "data. the" by --data. The--;
Line 29, after "It", insert --is--;

Column 5,
Line 51, after "vehicle 1", start a new paragraph;
Line 56, after "object", "0" should read --O--;
Line 60, before "haptic", --by-- should be inserted;
Line 62, after "on the", "accelerater" should read --accelerator--;

Column 6,
Line 40, after "vehicle 1", insert --,--;

Column 7,
Line 38, after "object", "0" should read --O--;

Claims

Column 10,
Line 52, claim 14, after "The", "safety system", should read --method--.

This certificate supersedes the Certificate of Correction issued May 24, 2016.

Signed and Sealed this
Nineteenth Day of July, 2016

Michelle K. Lee
*Director of the United States Patent and Trademark Office*